May 8, 1951     C. S. ASH     2,552,081

VEHICLE WHEEL

Filed July 19, 1945     3 Sheets-Sheet 1

INVENTOR.
Charles S. Ash.
BY
Attorney

May 8, 1951 C. S. ASH 2,552,081
VEHICLE WHEEL
Filed July 19, 1945 3 Sheets-Sheet 2

INVENTOR.
Charles S. Ash
BY
Hobart N. Durham
Attorney

May 8, 1951  C. S. ASH  2,552,081
VEHICLE WHEEL
Filed July 19, 1945  3 Sheets-Sheet 3

INVENTOR.
Charles S. Ash
BY
Hobart N. Durham
Attorney.

Patented May 8, 1951

2,552,081

UNITED STATES PATENT OFFICE 2,552,081

VEHICLE WHEEL

Charles S. Ash, Milford, Mich.

Application July 19, 1945, Serial No. 605,988

9 Claims. (Cl. 301—6)

The present invention relates to vehicle wheels and more particularly to such wheels adapted to carry a plurality of road engaging tires.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

It is an object of the present invention to provide a safe and sturdy vehicle wheel of a type suitable for heavy duty work designed to carry a plurality of road engaging elements as, for instance dual pneumatic tires. Another object is the provision of such a wheel which is more simple in construction and more economical to fabricate than conventional vehicle wheels for comparable uses.

Figure 1:
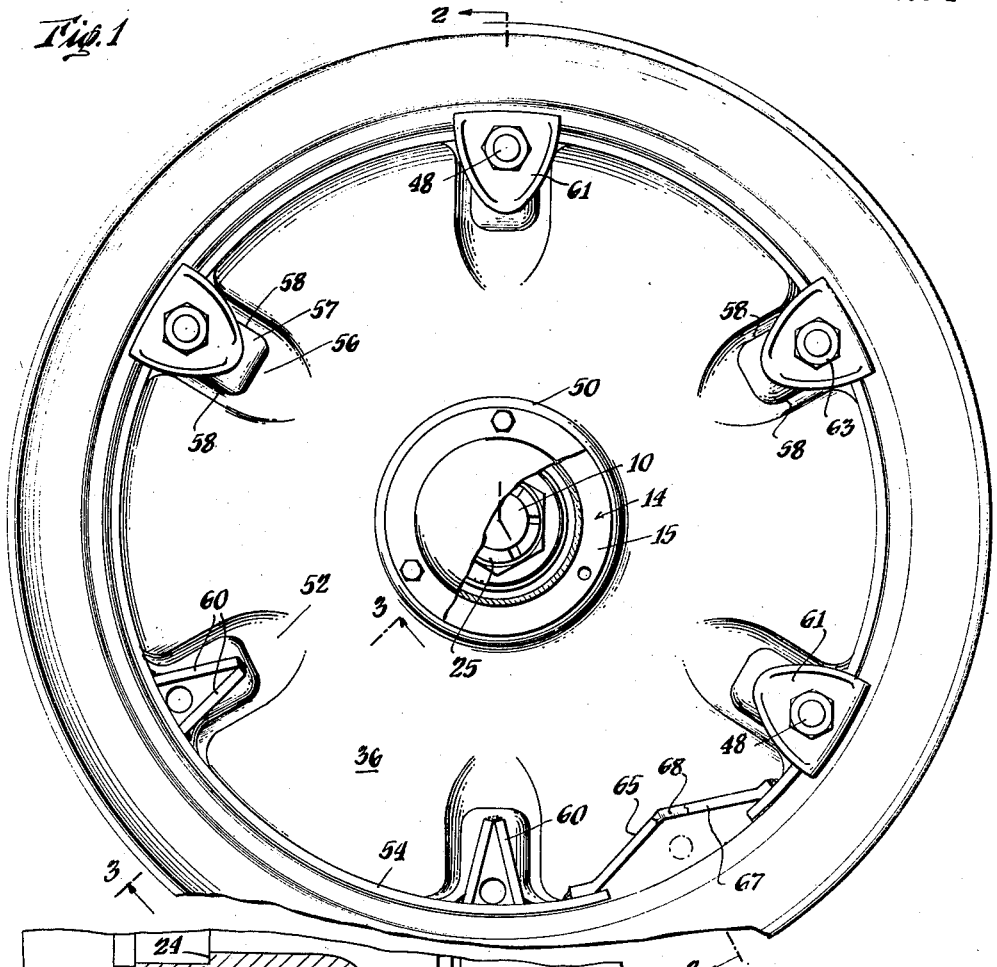
Fig. 1 is a side elevation of a vehicle wheel embodying the present invention viewed inwardly.
Figure 3:
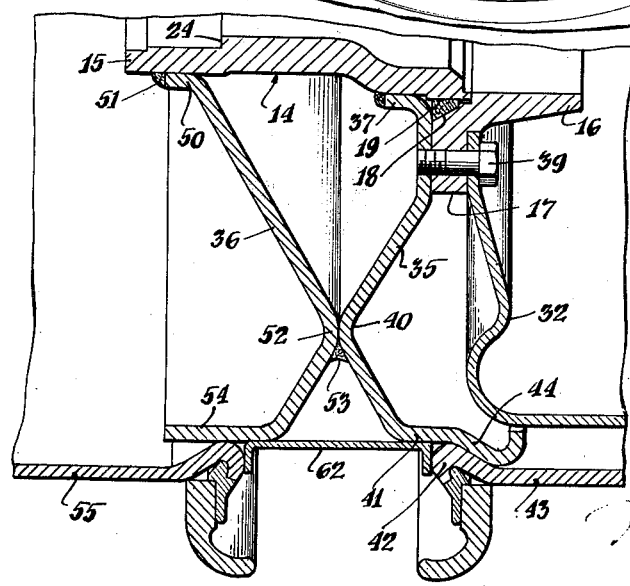
Fig. 3 is a cross sectional view taken along line 3—3 of Fig. 1.
Figure 2:
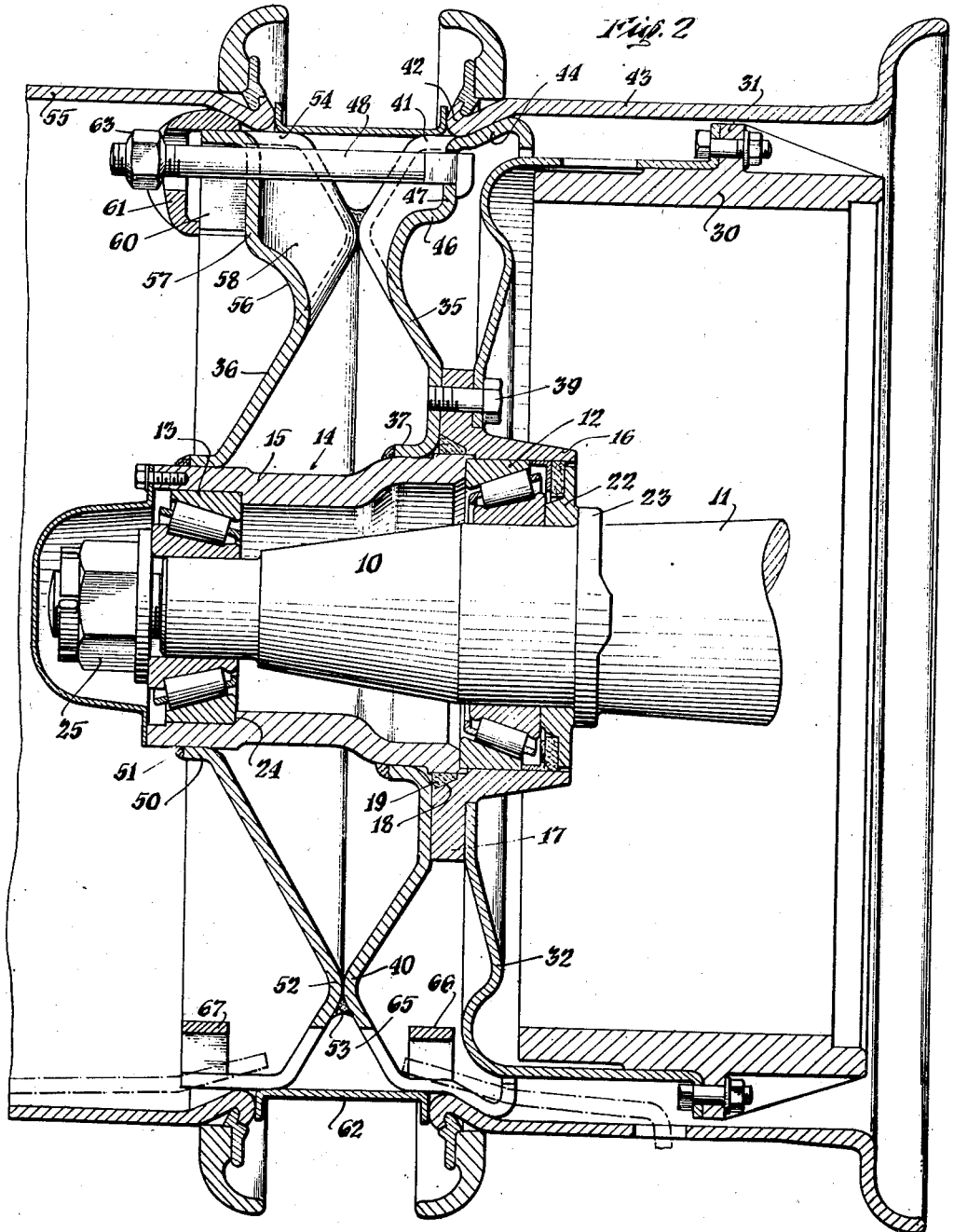
Fig. 2 is a cross sectional view taken along line 2—2 of Fig. 1.

Referring in detail to the illustrative embodiments of the invention shown by way of example in the accompanying drawings, and referring first to the embodiment shown in Figs. 1 to 3, the wheel of the present invention is adapted to be mounted on the reduced end or spindle 10 of a vehicle axle 11. As shown in Fig. 2, inner and outer roller bearings 12 and 13 respectively are mounted on suitable finished seats on the spindle 10 serving to freely rotatably mount the hub 14 of the wheel.

The wheel hub is formed, for greater facility and economy in fabrication, of an outer elongated substantially cylindrical portion 15 and an inner shorter portion 16, the latter portion having integrally formed therewith an outer radially extending flange 17 which serves as a brake drum anchor as well as a support for other portions of the wheel, as will be pointed out. The portion 16 of the hub has a flared or enlarged place 18 at the outer end of its central bore to accommodate a circular line of welding 19 of substantial size which securely joins the hub portions 15 and 16 together.

The inner race of bearing 12 seats against an annular ring 22 which in turn abuts against a shoulder 23 on the axle 11 preventing inward movement of the wheel assembly. The outer race of bearing 12 seats against the end of hub portion 15. The outer race of the outer bearing 13 seats against a shoulder 24 of the hub portion 15, and the whole assembly is maintained in place by a nut 25 on the end of spindle 10.

Braking means for the wheel comprise a cylindrical brake drum 30 at the inner side of the wheel assembly having a circumferential flange 31 about midway of its width on its outer surface. A connecting element 32 is provided secured at its inner end to flange 31 of the brake drum, and at its outer end of greatly reduced diameter to the flange 17 of hub 14. The central anchorage for the brake drum 30 prevents "bellmouthing" of the drum when excessive heats are generated, and the element 32 serves to dissipate brake drum heat before it is conducted in substantial amount to the vehicle wheel.

The vehicle wheel proper comprises an inner and an outer prefabricated web 35 and 36 respectively secured to the hub 14 and adapted to demountably mount pneumatic tire rims on their outer peripheries. As best shown in Fig. 2, the inner web 35 has an outwardly axially turned portion 37 at its inner periphery which is seated on an outer finished surface of hub portion 15 and is securely welded thereto by a circular weld. Immediately radially outwardly of portion 37 of inner web 35 the web has a substantially plane portion normal to the axis of the wheel, which seats firmly against the outer side of flange 17 and is held thereto by bolts 39, which likewise secured element 32 to the flange. Radially outwardly of the plane portion web 35 is formed with an outwardly flaring or enlarging frusto-conical portion, and then is reversely turned in another frusto-conical portion which extends axially inwardly of the wheel assembly. At the intersection of the frusto-conical web portions just described there is formed a curved annular projection 40 of the web 35, against which a similar portion of the outer web 36 abuts, as will hereinafter be described. The outer periphery of web 35 is axially inwardly turned to provide a substantially cylindrical seat 41 for the turned edge or bead 42 of a conventional pneumatic tire rim 43. Axially inwardly the seat 41 is outwardly radially flared to provide an inclined seat 44 against which the bead 42 also seats, preventing inner axial movement of the rim 43. At a plurality of spaced apart positions around the web 35 it is integrally formed in portions as indicated by numeral 46 which are inwardly axially offset in a curve from the main body of the web and formed with plane portions 47 apertured to receive rim mounting bolts 48 and seating the heads of such bolts.

The outer web 36 of the wheel is formed similarly to the inner web, having an outwardly turned cylindrical portion 50 at its inner periphery which seats on a finished outer surface of hub portion 15 and is securely welded thereto by a circular weld 51. Radially outwardly of portion 50, the web has a frusto-conical portion inwardly axially extending, and the web is then abruptly turned to form another frusto-conical portion extending axially outwardly. The frusto-conical portions just described merge centrally of the web body to form an annular projection 52 at the inner side of the web which abuts the projection 40 of the inner web 35. The webs are securely joined together at these projections by an external circular line of welding 53, forming a strong, easily fabricated and assembled composite vehicle wheel body.

At its outer periphery the web 36 has an outwardly axially extending cylindrical portion 54 to seat a tire rim 55 which is preferably a duplicate of rim 43 but oppositely positioned. At a plurality of places around the web 36, corresponding to the places 46 of the inner web, it is similarly formed with integral outwardly axially curved portions 56 turned to provide plane portions 57 which are apertured to receive the outer ends of bolts 48. Integral web portions 58 lie at either edge of plane portions 57 joining the latter to the cylindrical periphery 54. Within each open ended rectangular box formed by the web portions 58 there are provided a pair of plates 60 securely welded together in the form of a V and extending axially inwardly to the plane portion 57 of the outer web. These members are welded, as shown in Fig. 1, to the under surface of cylindrical peripheral portion 54 of the web, and at their vertices provide seats against which conventional lugs 61 may press. A cylindrical spacer ring 62 is provided between tire rims 43 and 55, and it will be apparent that nuts 63 on the ends of bolts 48 securely hold the dual rim assembly in place on the webs and allow for disassembly when desired.

As shown at the bottom of Fig. 2 of the drawings, the webs 35 and 36 at corresponding places are interrupted at their peripheries as indicated by numeral 65. As best shown in Fig. 1, inner and outer brackets 66 and 67 respectively are welded across these spaces, and may serve as supports for the valve stems to be positioned in the spaces so that ready access may be had thereto.

Figure 4:
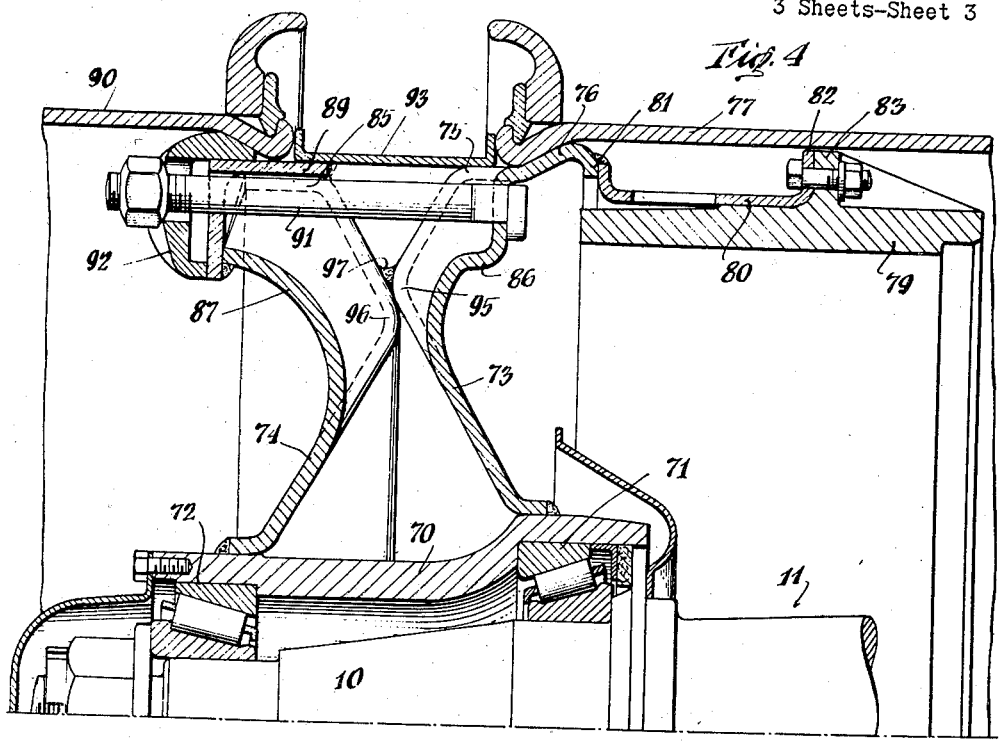
Fig. 4 is a cross-sectional view to the center line of the wheel of a modified embodiment of the present invention.

A somewhat modified embodiment of the vehicle wheel of the present invention is shown in Fig. 4 of the drawings, the wheel comprising a one-piece tubular hub member 70 internally formed to receive roller bearings 71 and 72 whereby the hub is mounted for free rotation on the spindle 10. This embodiment also comprises inner and outer webs 73 and 74 respectively, the inner web having an axially inwardly turned portion at its inner periphery securely welded on a finished outer surface of the hub 70, and the outer web having an axially outwardly turned inner peripheral portion likewise securely welded on a second outer finished surface of the hub.

As shown in Fig. 4, the inner web 73 flares radially outwardly in a frusto-conical portion nearer the hub, and is then reversely curved in an axially inwardly flaring frusto-conical portion to the outer periphery of the web. At this periphery the web is formed in an integral cylindrical portion 75 having a flared end 76, serving as a seat for a conventional tire rim 77. In this embodiment of the invention the brake drum 79 for the dual wheel is connected by means of a cylindrical adapter 80 to the radially inwardly turned portion 81 of the rim seat 75—76. The adapter 80 is securely welded to the web portion 81 as shown, and is connected by an end flange 82 to a centrally located flange 83 of drum 79 by means of suitable bolts.

The outer web 74 from its inner periphery flares axially inwardly in a frusto-conical portion and then is reversely curved in an axially outwardly directed frusto-conical portion, terminating in an outer peripheral cylindrical portion 85. Similarly to the embodiment of the invention shown in Fig. 1, an inner web 73 of the embodiment of Fig. 4 is formed in a plurality of axially inwardly curved portions 86 and the outer web is formed in a plurality of corresponding axially outwardly curved portions 87. Over the ends of the spoke formations formed by portions 85 and 87 on the outer web 74 there are welded L-shaped plates to serve as seats for an outer rim 90 which may be a duplicate of rim 77. Mounting bolts 91 extend through portions 86 of the inner web and through the downwardly extending reaches of plates 89, and lugs 92 and spacer ring 93 complete the demountable rim assembly.

It will be noted that the frusto-conical body portions of the inner web 73 which have been described merge centrally of the web in an annular projection 95 while the frusto-conical body portions of the outer web 74 merge in an annular projection 96. These projections in the assembled wheel are radially offset from each other, 96 being of smaller diameter than 95, so that the webs overlap and contact each other for a short radial distance before diverging from each other. The composite wheel is thus formed of mutually reinforcing parts, and the webs are securely welded together by a circular external weld 97.

Figure 5:
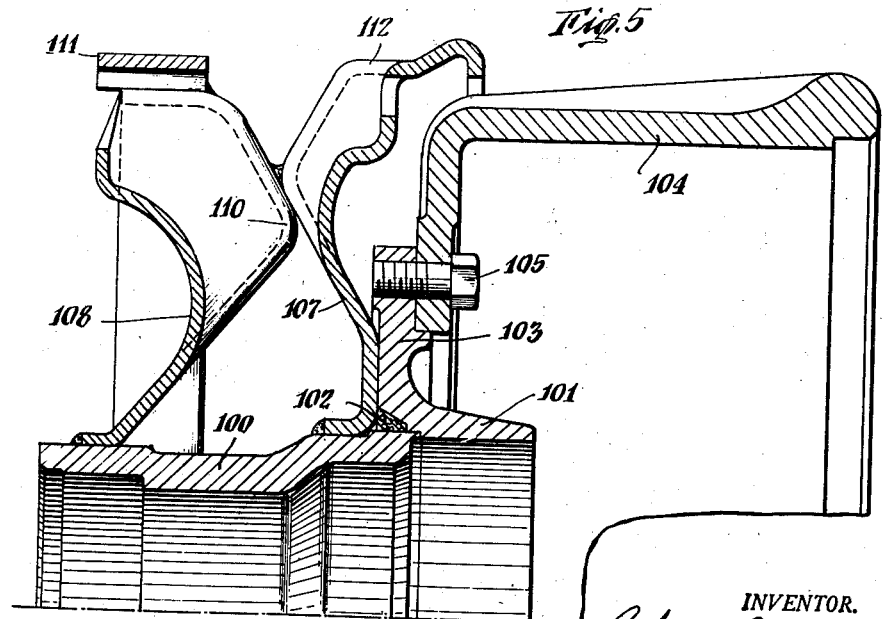
Fig. 5 is a cross-sectional view to the center line of the wheel of a third embodiment of the present invention.

In the embodiment of the invention shown in Fig. 5 of the drawings the hub assembly is similar to that in the embodiment shown in the first three figures of the drawings, being comprised of a tubular portion 100 and a shorter inner end portion 101 welded thereto as at 102, the portion 101 having an integral flange 103. A conventional brake drum 104 is secured by bolts 105 to the flange 103.

The inner and outer webs 107 and 108 respectively are secured at their inner peripheries to the hub portion 100 similarly to the embodiment shown in Figs. 1-3, the inner web receiving support from the flange 103. The webs then converge on each other overlapping along their central portions as indicated by the numeral 110 and being welded to each other. The webs then diverge to form rim seats, the formation being similar to that already described for the embodiment shown in Fig. 4. In this embodiment a plurality of plates 111 are welded to the spoke-like formations of the outer web 108 and adjustment may be made by the welding operation in a suitable jig so that the plates are in exact axial alignment with the cylindrical rim seat 112 on the inner web 107.

It will be noted by those familiar with vehicle wheel construction that the present invention provides a heavy duty wheel of a strong integral web type which is adapted to mount dual tires on rims of a conventional type so that they are easily mounted and demounted. The wheel body and hub are formed of easily prefabricated component parts which are simply assembled, and, when so assembled, mutually reinforce one another providing great strength for the finished wheel.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub, a pair of webs secured to said hub at their inner peripheries in axially spaced apart relationship, said webs contacting and being secured to each other centrally of their radial width, diverging from each other radially outwardly thereof to their outer peripheries and being formed immediately radially inwardly of their outer peripheries in a plurality of axially offset portions circumferentially spaced apart, and means for mounting a road engaging element on each web.

2. A vehicle wheel comprising, in combination, a hub, a pair of webs secured to said hub at their inner peripheries in axially spaced apart relationship, said webs contacting and being secured to each other centrally of their radial width, diverging from each other radially outwardly thereof to their outer peripheries and being formed with axially offset portions forming radially extending corrugations of substantial extent, and means for demountably mounting a rim on the outer periphery of each web.

3. A vehicle wheel comprising, in combination, a hub, a pair of webs secured to said hub at their inner peripheries in axially spaced apart relationship, said webs contacting each other along annular facing areas of their adjacent surfaces centrally of their radial widths and being secured to each other thereat, diverging from each other radially outwardly thereof to their outer peripheries and being formed immediately radially inwardly of their outer peripheries in a plurality of axially offset portions circumferentially spaced apart, and means for demountably mounting a rim on the outer periphery of each web.

4. A vehicle wheel comprising, in combination, a hub, a pair of webs secured to said hub at their inner peripheries in axially spaced apart relationship, said webs converging toward each other from the hub to the central portions of their radial widths and being thereat secured to each other, said webs being formed with axially extending, cylindrical peripheries and with a plurality of axially offset portions, circumferentially spaced apart, immediately radially inwardly of said cylindrical peripheries, and diverging from each other from said central portions to their outer peripheries, and means for demountably mounting a rim on the outer periphery of each web.

5. A vehicle wheel comprising, in combination, a hub, a pair of webs secured to said hub at their inner peripheries in axially spaced apart relationship, said webs converging toward each other from the hub to the central portions of their radial widths and being thereat secured to each other, and diverging from each other from said central portions to their outer peripheries, said peripheries being integrally formed in axially spaced, cylindrical, axially extending portions and circumferentially spaced, axially offset portions merging into said cylindrical portions, and means for demountably mounting a rim on said outer peripheral portion of each web.

6. A vehicle wheel comprising, in combination, a hub, a pair of webs secured to said hub at their inner peripheries in axially spaced apart relationship, said webs converging toward each other from the hub to the central portions of their radial widths and being thereat secured to each other, and diverging from each other from said central portions to their outer peripheries, said peripheries being integrally formed in cylindrical axially extending portions, said webs immediately radially inwardly of said cylindrical portions having a plurality of oppositely axially offset corresponding portions circumferentially spaced apart said offset portions having apertures to receive rim mounting bolts, and means for demountably mounting a rim on said cylindrical outer peripheral portion of each web including rim mounting bolts.

7. A vehicle wheel comprising, in combination, a hub, a pair of webs secured to said hub at their inner peripheries in axially spaced apart relationship said webs converging toward each other and being secured together centrally of their radial widths and diverging from each other at their outer peripheries, the inner web having a peripheral, inwardly axially turned cylindrical portion with a radially outwardly flared opening to seat a tire rim, the outer web having a plurality of spaced apart plates secured to its outer periphery in axial alignment with said turned cylindrical portion of the inner web for seating a tire rim, and means for demountably mounting a tire rim on said turned cylindrical portion and another rim on said plates.

8. A vehicle wheel assembly comprising, in combination, a tubular hub, a pair of webs secured to the external surface of said hub at their inner peripheries in axially spaced apart relationship, said webs converging toward each other and being secured together centrally of their radial widths and diverging from each other at their outer peripheries, means for demountably mounting a rim on the outer periphery of each web, and braking means for the wheel including a brake drum at the inner side of the inner web and a cylindrical element secured at one end to said drum and at the other end to the periphery of said inner web.

9. A vehicle wheel comprising, in combination, a hub, a pair of webs secured to said hub at their inner peripheries in axially spaced apart relationship, said webs having axially offset annular portions centrally of their radial widths said offset portions being of different diameters and substantially concentrically arranged and said webs abutting each other at inclined annular areas between said portions and centrally secured together, and means for demountably mounting a rim on the outer periphery of each web.

CHARLES S. ASH.

REFERENCES CITED

The following references are of record in the file of this patent:

UNITED STATES PATENTS

| Number | Name | Date |
|---|---|---|
| 1,489,687 | Ash | Apr. 8, 1924 |
| 1,599,845 | Shoemaker | Sept. 14, 1926 |
| 1,769,296 | Klaus | July 1, 1930 |
| 1,878,213 | Walther | Sept. 20, 1932 |
| 2,022,153 | Rogers | Nov. 26, 1935 |
| 2,051,498 | Short | Aug. 18, 1936 |
| 2,181,364 | Burger | Nov. 28, 1939 |